United States Patent
Lomelino et al.

(10) Patent No.: US 8,214,610 B2
(45) Date of Patent: Jul. 3, 2012

(54) MANAGING BACKUP DEVICE METADATA IN A HIGH AVAILABILITY DISK SUBSYSTEM

(75) Inventors: William Lomelino, Westminister, CO (US); Arindam Banerjee, Bangalore (IN); Pradeep Radhakrishna Venkatesha, Bangalore (IN); Jayaraj Rajappan, Bangalore (IN)

(73) Assignee: LSI Corporation, Milpitas, CA (US)

( * ) Notice: Subject to any disclaimer, the term of this patent is extended or adjusted under 35 U.S.C. 154(b) by 470 days.

(21) Appl. No.: 12/503,242

(22) Filed: Jul. 15, 2009

(65) Prior Publication Data

US 2011/0016260 A1  Jan. 20, 2011

(51) Int. Cl.
*G06F 12/00* (2006.01)
*G06F 13/00* (2006.01)

(52) U.S. Cl. ......... 711/162; 711/100; 711/154; 711/161

(58) Field of Classification Search .................. 711/100, 711/154, 161, 162
See application file for complete search history.

(56) References Cited

U.S. PATENT DOCUMENTS

| | | | | |
|---|---|---|---|---|
| 7,809,910 B2 * | 10/2010 | Sudhakar | ....................... | 711/162 |
| 7,900,006 B2 * | 3/2011 | Nagaraj | ....................... | 711/162 |

* cited by examiner

*Primary Examiner* — Tuan V. Thai

(74) *Attorney, Agent, or Firm* — Suiter Swantz pc llo

(57) ABSTRACT

A system includes a data storage device, a controller coupled with the data storage device, a backup device coupled with the controller for backing up a modified portion of data and volatile memory metadata stored by the controller, and a backup power source for powering the controller. The controller includes a pre-specified region of volatile memory for storing backup device metadata for managing a modified portion of data, the metadata comprising one or more intents corresponding to modified data written back to the data storage device. The controller is configured to invalidate the one or more intents. During a restore operation, the controller is configured to store the backup device metadata in the pre-specified region of volatile memory when a charge on the backup power source is at least a minimum threshold charge and to store the updated backup device metadata in the backup device during an interruption of power.

20 Claims, 2 Drawing Sheets

MANAGING BACKUP DEVICE METADATA IN A HIGH AVAILABILITY DISK SUBSYSTEM

TECHNICAL FIELD

The present disclosure generally relates to the field of data storage, and more particularly to a method and systems for managing data in a high availability disk subsystem.

BACKGROUND

It is generally desirable for a high availability disk subsystem to retain one or more portions of data during a power outage that would otherwise be stored in volatile memory. This may be accomplished by offloading the desired data to a flash device and then restoring the data when the power is restored. However, as restoration of the desired data from a flash device proceeds, data that has already been retrieved and/or restored should be marked as invalid. Otherwise, the system may attempt to restore the same data again on a subsequent restore (e.g., in the event of another power outage during an ongoing restore process).

The data written to the backup device is managed via metadata that also resides on the backup device. Once data is restored, it must be marked as invalid by updating the metadata on the backup device (e.g., updating log intents). In this manner, the metadata is written back to the flash device during the restore process. However, these periodic updates to the metadata on the flash device typically result in small (with respect to the data being restored) and/or random writes to the flash device. These scattered and/or random writes, in turn, may substantially reduce the input/output (I/O) throughput of the flash device.

In an I/O intensive application like a high availability disk subsystem, the restoration process is generally performed while the high availability disk subsystem services external (host) I/O requests. Thus, the above mentioned metadata updates to the flash device may have a dramatic negative impact on the ability of the high availability disk subsystem to service incoming I/O requests in a timely manner.

SUMMARY

A system includes a data storage device for storing data. The system also includes a controller coupled with the data storage device for controlling the data stored on the data storage device. The controller is configured to write back a modified portion of data to the data storage device. The controller includes a pre-specified region of volatile memory for storing the modified portion of data and metadata for managing the modified portion of data in volatile memory. Further, the system includes a backup device coupled with the controller for backing up the modified portion of data and volatile memory metadata. In order to manage all data written to the backup device a second metadata is created and also written to the backup device. Additionally, the system includes a backup power source for powering the controller. The backup power source has a minimum threshold charge necessary for backing up the modified portion of data and the volatile memory metadata to the backup device. During a restore operation, the controller is configured to store the backup device metadata in the pre-specified region of volatile memory when a charge on the backup power source is at least the minimum threshold charge and to keep/update the backup device metadata on the backup device in case of interruption of power during the restore.

A method includes initiating a restore operation to write back a modified portion of data stored on the backup device to a data storage device. The modified portion of data and volatile memory metadata is stored with backup device metadata comprising one or more intents corresponding to all data written back to the data storage device. The method also includes storing the backup device metadata in a pre-specified region of volatile memory of a controller coupled with the data storage device when a charge on a backup power source for powering the controller is at least a minimum threshold charge necessary for backing up backup device metadata to the backup device in case of interruption of power during the restore. Further, the method includes writing the backup device metadata stored in the pre-specified region of volatile memory of the controller to the backup device during an interruption of power during the restore. Additionally, the method includes invalidating the one or more intents corresponding to the modified data written back to the data storage device.

A system includes means for storing data. The system also includes means, coupled with the data storage means, for controlling the data stored on the data storage means. The controlling means is configured to write back a modified portion of data to the data storage means. The controlling means includes a pre-specified region of volatile memory for storing the modified portion of data and metadata for managing the modified portion of data in volatile memory. Further, the system includes a backup device coupled with the controlling means for backing up the modified portion of data and the volatile memory metadata. Further, the system includes backup device metadata for managing all data written to the backup device. Additionally, the system includes a backup power source for powering the controlling means, the backup power source having a minimum threshold charge necessary for backing up the modified portion of data and the volatile memory metadata to the backup device. During a restore operation, the controlling means is configured to store the backup device metadata in the pre-specified region of volatile memory when a charge on the backup power source is at least the minimum threshold charge and to keep/update the backup device metadata in the backup device during an interruption of power during the restore.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
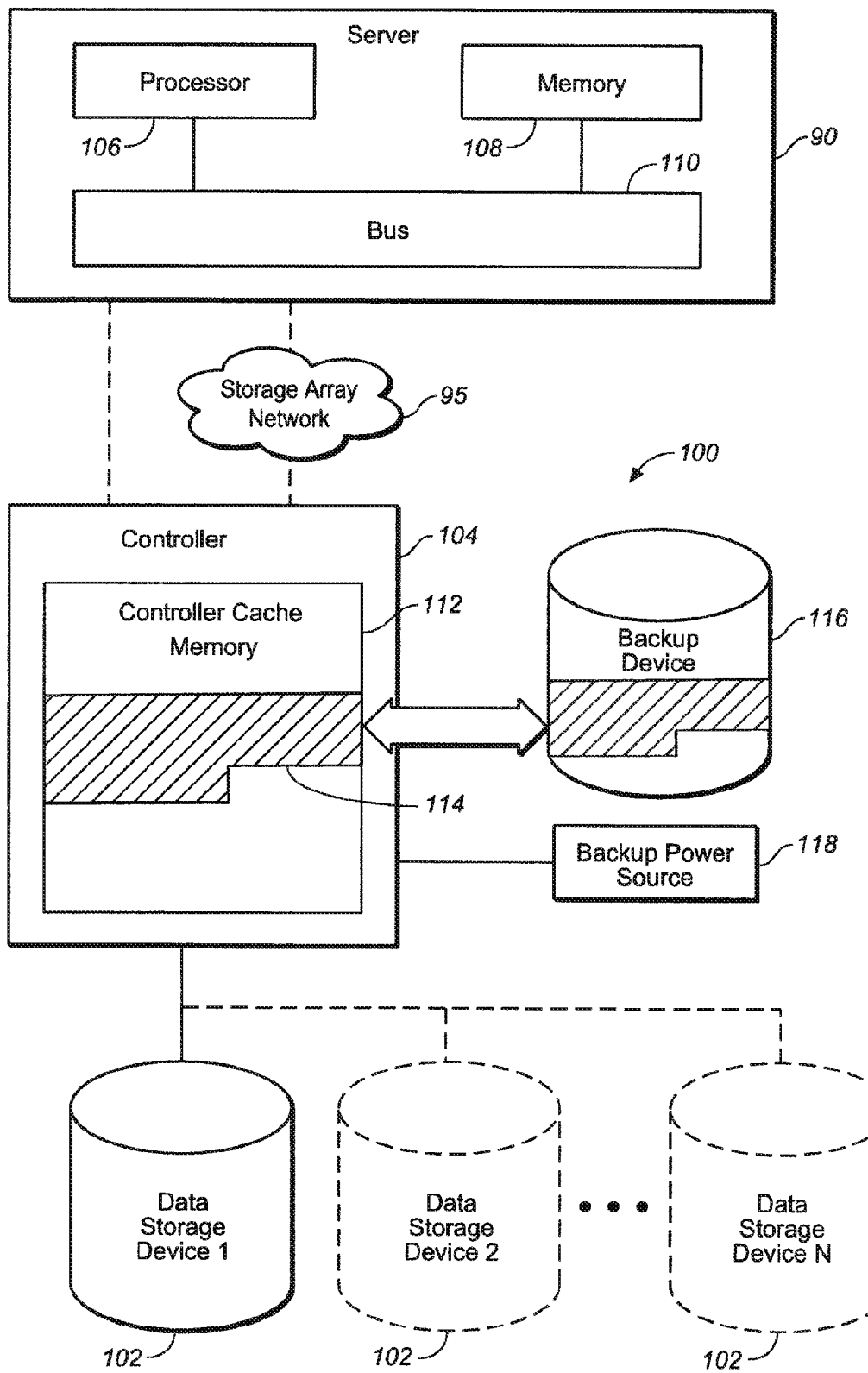
FIG. 1 is a schematic illustrating a system in accordance with the present disclosure.
Figure 2:
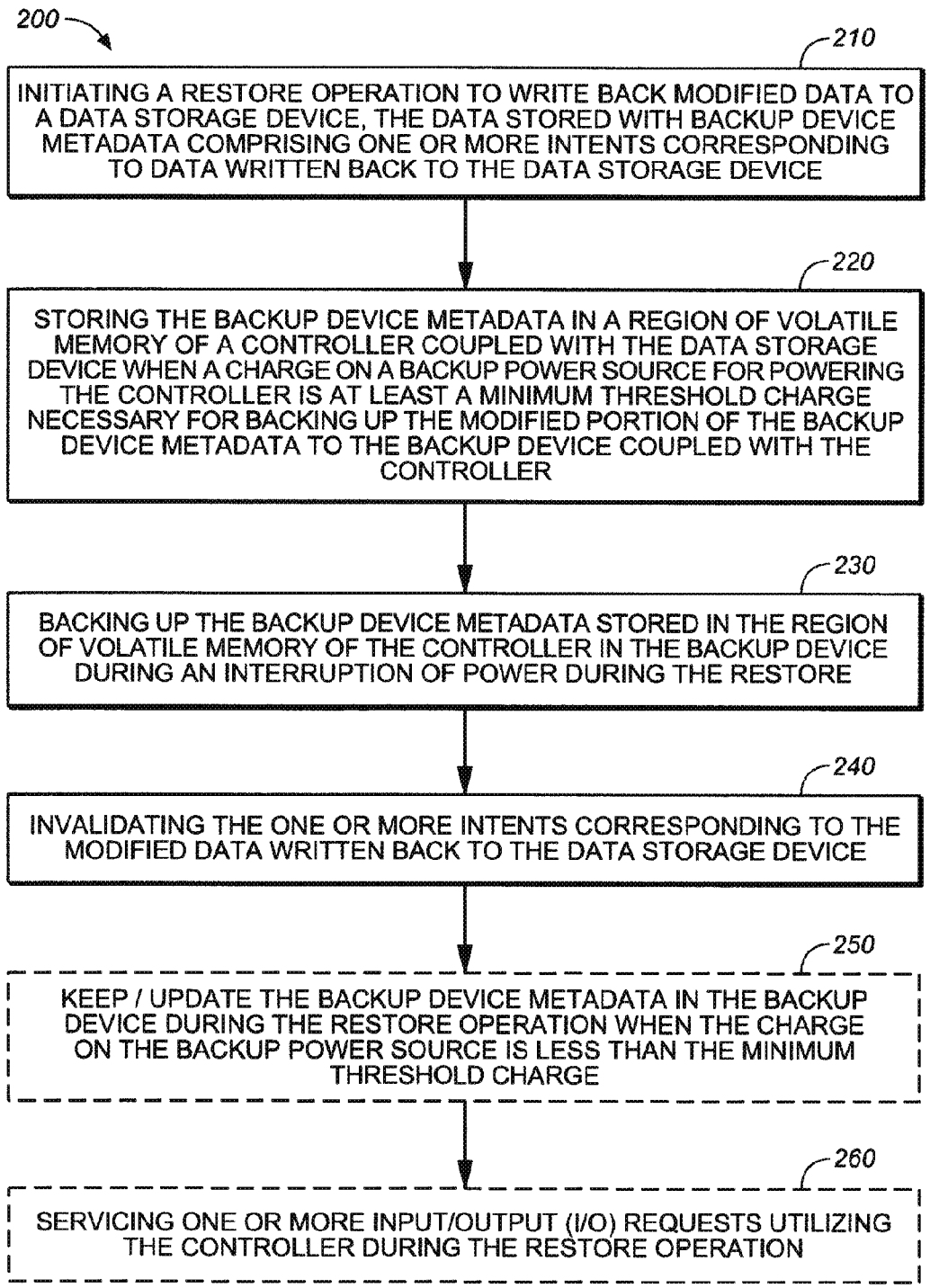
FIG. 2 is a flow diagram illustrating a method in accordance with the present disclosure.

Referring generally to FIGS. 1 and 2, a system 100 is described in accordance with the present disclosure. The system 100 includes one or more data storage devices 102 for storing data. For example, the data storage devices 102 may be included as part of a high availability disk subsystem. A high availability disk subsystem may include a number of normal availability disk subsystems with redundant hardware components, where the disk subsystems and hardware components are managed by hardware, software, and/or firmware that provides fault detection and correction procedures to maximize the availability of the disk subsystems. In an embodiment, the data storage devices 102 may be included as part of a Redundant Array of Independent Disks (RAID). The RAID array may be managed by a disk array controller, such as controller 104, coupled with one or more of the data storage devices 102. The controller 104 may be configured for controlling data stored on a data storage device 102 to provide fault detection and correction procedures for maximizing the availability of the RAID array.

The controller 104 is configured to write back a modified portion of data (i.e., a number of blocks of dirty cache data) to the data storage device 102. For instance, the controller 104 may be communicatively coupled with a server 90 including a processor 106 and/or a memory 108 connected via a bus 110. In one embodiment, the server 90 is directly connected to the controller 104. In another embodiment, the server 90 may be connected to the controller 104 via a Storage Array Network (SAN) 95. The processor 106 may execute a process requiring data from the data storage device 102. The processor may pass a request for the data to the controller 104 (e.g., via the SAN 95). The controller 104 may then retrieve the data and transfer it to the memory 108 via the SAN 95. At this point, the data is accessible by the processor 106 (via the bus 110). The processor 106 may alter a portion of the data stored in the memory 108. In many cases, it is desirable to write back this altered data to the data storage device 102. The processor 106 (which may comprise a Central Processing Unit (CPU), a Direct Memory Access (DMA) controller, or the like) may instruct the controller 104 to write back the modified data to the data storage device 102. In another instance, the controller 104 may be communicatively coupled with another computing system, such as another server, or the like. Additionally servers may be communicatively coupled with the controller 104 via the SAN 95, or via another connection. The controller 104 may receive a modified portion of data from another server for writing back to the data storage device 102.

The controller 104 may include a volatile memory (e.g., controller cache memory 112) for storing modified data (e.g., a modified portion of data comprising a number of blocks of dirty cache data) for writing back to the data storage device 102. The controller 104 includes a pre-specified region of volatile memory 114 for storing the modified data and volatile memory metadata for managing the modified data for writing back to the data storage device 102. The metadata includes one or more intents corresponding to modified data already written back to the data storage device 102.

The system 100 includes a nonvolatile memory (e.g., backup device 116) coupled with the controller 104 for backing up the modified portion of data and the volatile memory metadata. The controller 104 also includes a second set of metadata to manage all data written to the backup device. Further, the system 100 includes a backup power source 118 for powering the controller 104 (e.g., a battery connected to a power source for storing energy, a battery included with an Uninterruptible Power Supply (UPS), a fuel cell, a generator, connection to a separate power grid, or the like). Utilizing the backup power source 118 in the case of a power outage (e.g., loss of power from AC mains), the controller 104 may be configured to write the modified portion of data and the volatile memory metadata to the backup device.

The system 100 will once AC power is restored will restore all modified data written to the backup device during the backup to the data storage device 102. The controller 104 is configured to invalidate the one or more intents corresponding to the modified data written back to the data storage device 102. In one specific embodiment, the pre-specified region of volatile memory 114 for storing backup device metadata may be allocated from a separate region of controller cache memory 112 (e.g., the first 16 Megabytes (MB) of cache memory utilized for storing debug information. The backup metadata is read back to the pre-specified region of volatile memory 114 of the controller 104 before any I/O requests are serviced during the restore. All updates to the intents of the backup device metadata in the pre-specified region of volatile memory 114 may reduce the number of scattered and/or random writes to the backup device 116, which may, in turn, increase the IO throughput of the system 100. One the restore is finished the backup metadata which specifies no valid intents left on the backup device will be written back to the backup device.

For example, in the case of an interrupted restore (e.g., a scenario where a power outage occurs during a first restore, interrupting the first restore), the backup device metadata that was written back to the backup device 116 is read back to the pre-specified region of volatile memory 114 of the controller 104 before any I/O requests are serviced during a subsequent restore. In this manner, metadata updates corresponding to the newly restored data are written directly to the pre-specified region of volatile memory 114 of the controller 104 after the power is restored. Further, updating the intents to the pre-specified region of volatile memory 114 may reduce the number of scattered and/or random writes to the flash device 116, which may, in turn, increase the I/O throughput of the system 100.

In order to facilitate storing the backup device metadata in the pre-specified region of volatile memory 114 of the controller 104 while maximizing data throughput, it is necessary to ensure that the backup power source 118 has sufficient power to write back the backup device metadata to the backup device 116 in the event of a power failure. For example, a minimum threshold charge may be determined for the backup power source 118, where the minimum threshold charge is the amount of power necessary to back up the updated backup device metadata to the backup device 116. Thus, when a charge on the backup power source 118 is at least the minimum threshold charge, the controller 104 is configured to store the backup device metadata in the pre-specified region of volatile memory 114. Alternatively, when the charge on the backup power source 118 is less than the minimum threshold charge, the controller 104 is configured to keep/update the storage device metadata in the flash device 116 while mirroring the data to the pre-specified region of volatile memory 114.

Because the restore of data from the backup device can happen in a random order when a host I/O request or a background cache sync operation requests data that has not yet been restored from a backup device, such as the backup device 116, random writes associated with the restore process may lead to decreased performance during the restore operation. Thus, storing the backup device metadata in the pre-specified region of volatile memory 114 of the controller 104 when the charge on the backup power source 118 is at least the minimum threshold charge may contribute to increasing the I/O throughput of the system 100. While a restore operation is in progress, interruptions in the form of another power loss, a controller reset, or any condition resulting in a cold reset may result in a loss of the updates to the backup device metadata from cache memory, if the backup device metadata is not offloaded to the backup device 116 again. In order to retain the contents of the updated backup device metadata in the controller cache memory 112, the pre-specified region of volatile memory 114 is offloaded to the backup device 116 during the subsequent power outage. On a subsequent power restore, the updated backup device metadata is again restored from the backup device 116 to the same pre-specified region of volatile memory 114 so that the restore operation can resume from where it left off.

The following pseudo code describes this process:

```
During restore phase:
    If (battery charge >= minimum threshold charge)
        Read backup device metadata on the backup device and
            store the backup device metadata in controller
            cache memory
    Else
        Update the backup device metadata directly in backup
            devices
During second power outage:
    If updated backup device metadata stored in cache memory
        Offload backup device metadata region to backup device
During second restore phase:
    If (battery charge >= minimum threshold charge)
        Read backup device metadata on the backup device and
            store the backup device metadata in controller
            cache memory
        Mark new backup device metadata updates in cache
            memory
    Else
        Update the backup device metadata directly in backup
            devices
```

It should be noted that this technique may provide a faster method to invalidate the "already restored" data from the backup devices. Since I/O requests can occur from a host I/O context, the present technique decreases response time to host I/Os, increasing host I/O performance during a data restore operation. It should also be noted that the data restoration happens within the context of a host I/O. First, the cache block corresponding to the Logical Block Address (LBA) range of the new I/O is restored from the flash devices and synched to the RAID volumes, then the new host I/O is serviced. In this manner, faster restore times may lead to faster I/O response times.

A method 200 includes initiating a restore operation to write back a modified portion of data to a data storage device. The modified portion of data and volatile memory metadata is stored with the backup device metadata which includes one or more intents corresponding to modified data written back to the data storage device, 210. The method 200 includes storing the backup device metadata in a pre-specified region of volatile memory of a controller coupled with the data storage device when a charge on a backup power source for powering the controller is at least a minimum threshold charge necessary for backing up the modified portion of the backup device metadata to the backup device coupled with the controller, 220. The method 200 includes backing up the modified portion of the backup device metadata stored by the pre-specified region of volatile memory of the controller to the backup device during an interruption of power, 230. The method 200 includes invalidating the one or more intents corresponding to the modified data written back to the data storage device, 240. The method 200 may also include updating the backup device metadata in the backup device during the restore operation when the charge on the backup power source is less than the minimum threshold charge, 250. The method 200 may also include servicing one or more input/output (I/O) requests utilizing the controller during the restore operation, 260.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
   a data storage device for storing data;
   a controller coupled with the data storage device for controlling the data stored on the data storage device, the controller configured to write back a modified portion of data to the data storage device, the controller including a pre-specified region of volatile memory for storing the modified portion of data and nonvolatile memory metadata for managing the modified portion of data, the nonvolatile memory metadata comprising one or more intents corresponding to modified data written back to the data storage device, the controller configured to invalidate the one or more intents corresponding to the modified data written back to the data storage device;
   a backup device coupled with the controller for backing up the modified portion of data and the volatile memory metadata along with a backup device metadata; and
   a backup power source for powering the controller,
   wherein, during a restore operation, the controller is configured to store the backup device metadata in the pre-specified region of volatile memory when a charge on the backup power source is at least a minimum threshold charge and to store updated backup device metadata in the backup device during an interruption of power.

2. The system of claim 1, wherein, during the first restore operation, the controller is configured to utilize the backup device metadata in the backup device when the charge on the backup power source is less than the minimum threshold charge, and, during the first restore operation and a second restore operation, the controller is configured to invalidate the one or more intents corresponding to the modified data written back to the data storage device from the backup device.

3. The system of claim 1, wherein the backup device comprises flash memory.

4. The system of claim 1, wherein the pre-specified region of volatile memory comprises cache memory.

5. The system of claim 1, wherein the backup power source comprises a battery.

6. The system of claim 1, wherein the data storage device comprises a high availability subsystem.

7. The system of claim 1, wherein the controller is configured for servicing one or more input/output (I/O) requests during the restore operation.

8. A method, comprising:
  initiating a restore operation to write back a modified portion of data to a data storage device, the modified portion of data managed on a backup device via a backup device metadata comprising one or more intents corresponding to modified data written back to the data storage device;
  storing the backup device metadata in a pre-specified region of volatile memory of a controller coupled with the data storage device when a charge on a backup power source for powering the controller is at least a minimum threshold charge necessary for backing up updated backup device metadata to a backup device coupled with the controller;
  backing up the updated backup device metadata stored by the pre-specified region of volatile memory of the controller in the backup device during an interruption of power; and
  invalidating the one or more intents corresponding to the modified data written back to the data storage device.

9. The method of claim 8, further comprising:
  updating the backup device metadata in the backup device during the restore operation when the charge on the backup power source is less than the minimum threshold charge.

10. The method of claim 8, wherein the backup device comprises flash memory.

11. The method of claim 8, wherein the pre-specified region of volatile memory comprises cache memory.

12. The method of claim 8, wherein the backup power source comprises a battery.

13. The method of claim 8, wherein the data storage device comprises a high availability subsystem.

14. The method of claim 8, further comprising:
  servicing one or more input/output (I/O) requests utilizing the controller during the restore operation.

15. A system, comprising:
  means for storing data;
  means, coupled with the data storage means, for controlling the data stored on the data storage means, the controlling means configured to write back a modified portion of data to the data storage means, the controlling means including a pre-specified region of volatile memory for storing the modified portion of data and volatile memory metadata for managing the modified portion of data;
  a backup device coupled with the controlling means for backing up the modified portion of data and the volatile memory metadata along with a backup device metadata; and
  a backup power source for powering the controlling means
  wherein, during a restore operation, the controlling means is configured to store the backup device metadata comprising one or more intents corresponding to modified data written back to the data storage means, the controlling means configured to invalidate the one or more intents corresponding to the modified data written back to the data storage means in the pre-specified region of volatile memory when a charge on the backup power source is at least a minimum threshold charge and to store updated backup device metadata in the backup device memory during an interruption of power.

16. The system of claim 15, wherein, during the first restore operation, the controlling means is configured to store the updated backup device metadata in the backup device when the charge on the backup power source is less than the minimum threshold charge, and, during the first restore operation and a second restore operation, the controlling means is configured to invalidate the one or more intents corresponding to the modified data written back to the data storage means from the backup device.

17. The system of claim 15, wherein the backup device comprises flash memory.

18. The system of claim 15, wherein the pre-specified region of volatile memory comprises cache memory.

19. The system of claim 15, wherein the backup power source comprises a battery.

20. The system of claim 15, wherein the data storage means comprises a high availability subsystem.

* * * * *